March 17, 1953    J. R. WINTER, JR    2,631,471
ROCKER ARM
Filed Oct. 4, 1946
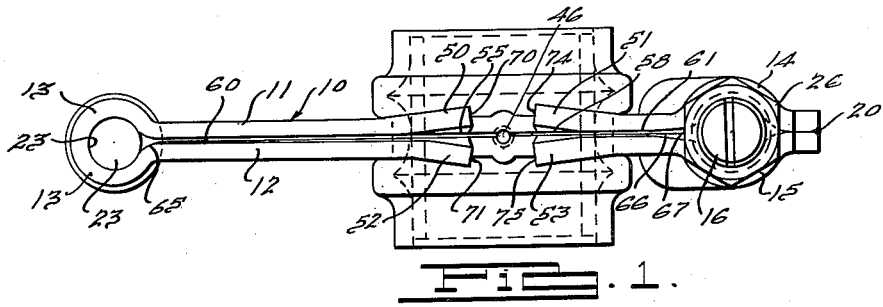
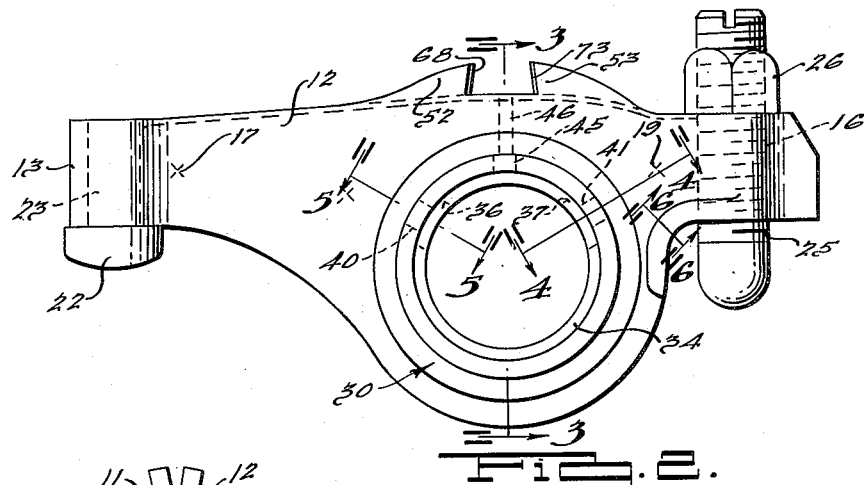
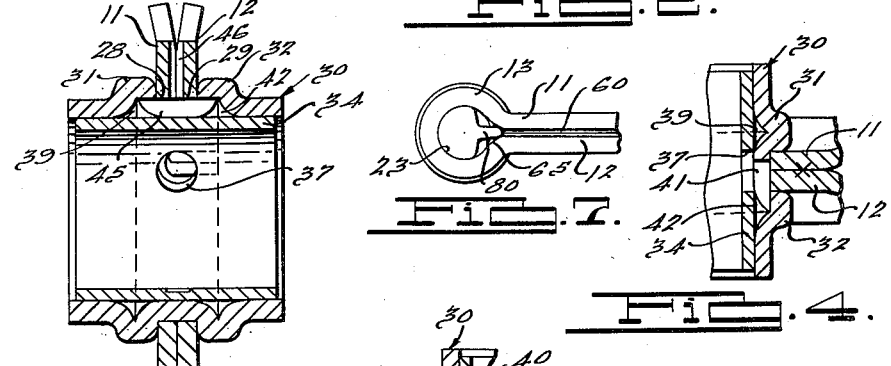
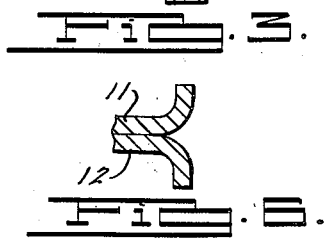
INVENTOR.
John R. Winter, Jr.
BY
Harness, Dickey & Pierce
ATTORNEYS.

Patented Mar. 17, 1953

2,631,471

UNITED STATES PATENT OFFICE 2,631,471

ROCKER ARM

John R. Winter, Jr., Detroit, Mich., assignor, by direct and mesne assignments, to John R. Winter, Sr., Detroit, Mich.

Application October 4, 1946, Serial No. 701,150

11 Claims. (Cl. 74—519)

The invention relates generally to internal combustion engines and it has particular relation to a rocker arm adapted to be used for operating valves.

In certain respects the invention constitutes an improvement over the rocker arms disclosed and claimed in my copending applications for patent, Serial No. 545,597, filed July 19, 1944, now Pat. No. 2,578,638, issued December 11, 1951, Serial No. 560,532, filed October 27, 1944, now Pat. No. 2,509,661 issued May 30, 1950, and Serial No. 582,039, filed March 10, 1945, now Pat No. 2,523,-489, issued September 26, 1950. In each of these applications for patent a rocker arm is disclosed comprising a laminated stamping having a transverse opening which receives a tubular hub element. This element is bulbed at each side of the stamping so as to form an annular head at each side of the arm and the two heads rigidly lock the laminations together and also rigidly lock the element to the stamping. A bearing sleeve is disposed in this hub element for receiving the rocker arm shaft and during operation of the engine, the rocker arm oscillates on the shaft. Lubricant supplied to the shaft flows through openings therein and in the bearing sleeve to a groove formed at the joining edges of the laminations and from this groove it is conducted through an upwardly extending opening in the stamping to the upper edge thereof. From this point it flows in opposite directions to the ends of the arm.

One object of the present invention is to provide an improved arrangement for supplying or conducting lubricant to the ends of the arm which includes the annular grooves provided by the bulbed heads.

Another object of the invention is to provide a lubricating arrangement such as stated above wherein the grooves provided in the bulbed heads serve as selective lubricant passages.

Another object of the invention is to provide an improved lubricating arrangement in a rocker arm such as described wherein the passages for conducting the lubricant are tortuous or irregular so as to promote a slower flow of lubricant to the upper edge of the arm and thus prevent undesirable squirting of the lubricant into the air above the arm.

Other objects of the invention will become apparent from the following specification, from the drawings relating thereto, and from the claims hereinafter set forth.

For a better understanding of the invention reference may be had to the drawings wherein:

Figure 1 is a plan view of a rocker arm constructed according to one form of the invention.

Figure 2 is a side elevational view of the rocker arm shown by Figure 1.

Figure 3 is a cross sectional view taken substantially along the line 3—3 of Figure 2.

Figure 4 is a cross sectional view taken substantially along the line 4—4 of Figure 2.

Figure 5 is a cross sectional view taken substantially along the line 5—5 of Figure 2.

Figure 6 is a cross sectional view taken substantially along the line 6—6 of Figure 2.

Figure 7 is a fragmentary plan view of the end of an arm constructed according to another form of the invention.

Referring to the figures, the body of the arm comprises a stamping 10 having laminations 11 and 12 integrally connected at one end by a substantially cylindrical portion 13 and, initially, the laminations are stamped from sheet metal and then are bent intermediate their ends to form the cylindrical portion. At the opposite end of the stamping, the laminations have outwardly pressed portions 14 and 15 respectively, so as to form an opening 16 between them. After the stamping is bent into the shape shown, the laminations may be spot welded at suitable points as indicated at 17 and 19. Also, as shown particularly by Figure 1, the ends of the arm outwardly of the opening 16 are electric arc welded as indicated at 20.

At that end of the arm having the cylindrical portion 13, a bearing element 22 is mounted on the arm by means of a shank 23 having a press fit in the opening in the cylindrical portion. This bearing element is constructed from hardened steel and since the shank has a press fit in the cylindrical portion, the element can be driven out of the latter and replaced in the event replacement should ever be desired. The opening 16 at the other end of the arm has a threaded bearing element 25 threaded therethrough and a lock nut 26 on this element holds it in any adjusted position.

Intermediate its ends the laminations 11 and 12 have openings 28 and 29 respectively and these may be formed in the metal prior to bending it into a laminated form. A tubular element 30 extends through the openings 28 and 29 and is rigidly connected to the laminations by means of outwardly bulbed heads 31 and 32 located at the outer sides of the laminations. These heads are formed by axially compressing the tubular element 30 so as to fold the walls in a manner described particularly in my application for patent, Serial No. 545,597, filed July 19, 1944, now Pat. No. 2,578,638, issued December 11, 1951. It should be understood that when the heads are finally formed, the laminations are strongly and tightly drawn together and at the same time the tubular element is strongly and positively connected to the laminations. A bearing sleeve 34 is provided within the element 30 and this sleeve receives a tubular shaft not shown upon which the rocker arm oscillates during its operation. Oil is supplied to the interior of the shaft under a desired pressure and reaches the inner surface of the sleeve 34 by means of radial openings in the shaft.

The lubricant passes from the shaft through openings 36 and 37 in the sleeve and these openings are substantially in the plane of the laminations 11 and 12. As best shown by Figure 5, the opening 36 coincides or is in alignment with an axial slot 40 formed in the wall of the hub element 30 and this slot extends through the inner wall of the bulbed head 31 and intersects an annular groove 39 formed in the bulbed head during the bulbing or folding of the hub wall. As shown by Figure 4, the opening 37 in the bearing sleeve 34 coincides or is in alignment with an axial slot 41 in the hub wall which extends through the inner wall of the bulbed head 32 and intersects an annular groove 42 formed in the bulbed head during the bulbing operation. It is to be noted that the slot 40 does not communicate with the annular groove 42 and that the slot 41 does not communicate with the annular groove 39 so that oil flowing through opening 37 flows to the groove 42 and oil flowing through opening 36 flows to the groove 39. It is to be understood that the bearing sleeve has a press or tight fit in the hub element 30 so that the sleeve moves with the arm during oscillation of the latter.

Usually the hollow shaft will have a pair of radial openings and these may be so located that when the rocker arm oscillates, one opening in the shaft will for an instant become aligned with the opening 37 in the bearing sleeve and then the other opening in the shaft will become aligned with opening 36 so that during any single oscillation, oil will flow through the opening 36 and then through opening 37. However, it may be that the openings in the shaft might not be located to register with openings 36 and 37 and instead merely supply lubricant between the surfaces of the shaft and bearing sleeve and in this event the oil would flow between these surfaces and to the openings 36 and 37.

As best shown by Figure 3, the hub element, substantially midway between the slots 40 and 41 has an axial slot 45 which extends to both of the annular grooves 39 and 42 so that lubricant in either groove may flow into this slot. This slot communicates with a vertically extending opening 46 formed between the stampings and such opening leads to the upper edge of the arm.

In order to control the flow of lubricant from the upper end of opening 46 to the opposite ends of the rocker arm, as has been brought out particularly in my application for Patent No. 560,532, the lamination 11 has vertically directing projections or ears 50 and 51 at opposite sides of the opening 46 and similarly the lamination 12 has upwardly directing projections or ears 52 and 53 at opposite sides of the opening 46. The ears 50 and 52 are aligned transversely of the laminations and are bent apart to form a V-shape lubricant passage 55. Similarly, the ears 51 and 53 are bent apart to form a V-shape lubricant passage 58 and the size of these passages 55 and 58 can be varied, depending upon the extent to which the ears are bent apart. This provides a control means for adjusting the amount of lubricant that will flow through the passages towards the ends of the rocker arm.

Also, as has been brought out particularly in such copending application for patent, the two laminations at their upper edges are formed to provide lubricant conducting grooves 60 and 61 leading from the passages 55 and 58 respectively, and extending to opposite ends of the arm. The groove 60 leads to a downwardly extending passage 65 in the cylindrical portion 13 which is formed where the straight part of the arm joins the cylindrical portion and this opening will conduct lubricant downwardly and past the head 22 on the lower end of the bearing element. Some lubricant also may flow over the sides of the cylindrical portion and downwardly to this head but in both instances the lubricant reaches the lower surface of the head. At the opposite end of the rocker arm the groove 61 joins a larger groove 66 which leads to a downwardly directed passage 67 formed between the laminations so that lubricant may flow downwardly to the end of the threaded bearing element 25.

The faces of the ears 50 and 52 next to the opening 46 are inclined upwardly and inwardly as indicated at 68 in Figure 2 and also are inclined laterally and slightly away from the hole 46 as indicated at 70 and 71. Similarly, the faces of the ears 51 and 53 are inclined upwardly and inwardly as indicated at 73 in Figure 2 and laterally and slightly away from hole 46 as indicated at 74 and 75. These faces act as dams which prevent lubricant from flowing to the ends of arm except as permitted by the grooves 55 and 58 and the angled faces, as shown in Figure 1, act to cause the excess lubricant to flow laterally over the sides of the arm.

During operation as the arm oscillates, lubricant will flow through the opening 37 in the bearing sleeve and then through the axial slot 41 to the annular groove 42 in the bulbed head 32 and also it will flow through the opening 36 in the bearing sleeve and through the axial slot 40 into the annular groove 39 in the bulbed head 31. From each annular groove the lubricant flows to the axial slot 45 and then through the opening 46 to the upper edge of the arm. This arrangement not only provides two lubricating passages but it also provides tortuous and irregular paths which tend to prevent the lubricant from squirting upwardly to an undesirable extent above the upper edge of the arm. If the lubricant squirts upwardly to an undesirable extent, some of it might be thrown over the ears 50, 51, 52 and 53 as the arm oscillates and an undesirable quantity of lubricant might find its way to the ends of the arm. It is desirable that the lubricant may flow more slowly out of opening 56 so that its flow may be controlled more definitely between the two sets of ears and the tortuous paths in acting as a means for slowing up the lubricant flow therefore operate to provide greater accuracy in the control of lubricant flowing to the ends of the arm.

In the form shown by Fig. 7, the upper end portion of the shank 23 is pinched or pressed together at one side to provide a tongue 80 which projects into the vertical recess 65 at the side of the pin. This tongue acts to locate the shank so that the lower curved surface of head 22, which is cylindrical, can be more readily disposed with its axis parallel to the axis of the hub sleeve 30.

Although more than one form of the invention has been illustrated and described in detail, it will be apparent to those skilled in the art that various modifications may be made without departing from the spirit of the invention and from the scope of the claims.

What is claimed is:

1. A rocker arm comprising an arm having a transverse opening, a tubular hub element extending through the opening, means rigidly connecting the element to the arm and comprising an annular bulbed head on the element on one side of the arm, and means for lubricating an end of the arm including an annular passage within the bulbed head.

2. A rocker arm comprising an arm having a transverse opening, a tubular hub element extending through the opening, means rigidly connecting the element to the arm and comprising annular bulbed heads on the element and operatively engaging opposite sides of the arm respectively, each of said bulbed heads providing an annular groove or passage between its folded walls, a sleeve fastened in the hub element and having lubricant openings in its wall which communicate with the grooves, and means for conducting lubricant from the grooves to the ends of the arm.

3. A rocker arm comprising an arm having a transverse opening, a tubular hub element extending through the opening, means rigidly connecting the element to the arm and comprising annular bulbed heads on the element and operatively engaging opposite sides of the arm respectively, each of said bulbed heads providing an annular groove or passage between its folded walls, a sleeve fastened in the hub element and having circumferentially spaced openings in its wall which communicate respectively with the grooves, and means for conducting lubricant from the grooves to the ends of the arm.

4. A rocker arm comprising an arm having a transverse opening, a tubular hub element extending through the opening, means rigidly connecting the element to the arm and comprising annular bulbed heads on the element and operatively engaging opposite sides of the arm respectively, each of said bulbed heads providing an annular groove or passage between its folded walls, a sleeve fastened in the hub and having lubricant openings in its wall which communicate with the grooves, and means for conducting lubricant to the ends of the arm including a slot in the wall of the hub element and extending between and connecting the two grooves.

5. A rocker arm comprising an arm having a transverse opening, a tubular hub element extending through the opening, means rigidly connecting the element to the arm and comprising an annular bulbed head on the element on one side of the arm, said head providing an annular groove between its folded walls, a bearing sleeve fastened in the hub element and having an opening in its wall which communicates with the groove, and means communicating with the groove for lubricating an end of the arm.

6. A rocker arm comprising an arm having a transverse opening, a tubular hub element extending through the opening, means rigidly connecting the element to the arm and comprising annular bulbed heads on the element and operatively engaging opposite sides of the arm respectively, each of said bulbed heads providing an annular groove or passage between its folded walls, and a sleeve fastened in the hub element and having circumferentially spaced lubricant openings in its wall, said hub element having circumferentially spaced slots in its wall, one of which connects one groove with one of the openings in the sleeve and the other of which connects the other groove with the other opening in the sleeve.

7. A rocker arm comprising an arm having a transverse opening, a tubular hub element extending through the opening, means rigidly connecting the element to the arm and comprising annular bulbed heads on the element and operatively engaging opposite sides of the arm respectively, each of said bulbed heads providing an annular groove or passage between its folded walls, a sleeve fastened in the hub element and having circumferentially spaced lubricant openings in its wall, said hub element having circumferentially spaced longitudinally extending slots in its wall one of which connects one groove with one of the openings in the sleeve and the other of which connects the other groove with the other opening in the sleeve, said hub element having a third longitudinally extending slot which connects both grooves, and means for conducting lubricant to one end of the arm including an opening in the arm which leads to the third slot.

8. A rocker arm comprising an arm having a transverse opening, a tubular hub element extending through the opening, means rigidly connecting the element to the arm and comprising an annular bulbed head on the element on one side of the arm, and means for lubricating an end of the arm including an annular channel located at least partly within the bulbed head and opening inwardly of the tubular hub element and adapted to be substantially closed off by a bearing sleeve inserted in said hub element.

9. A rocker arm comprising an arm having a transverse opening, a tubular hub element extending through the opening, means rigidly connecting the element to the arm and comprising an annular bulbed head on the element on one side of the arm, and means for lubricating an end of the arm including an annular channel located at least partly within the bulbed head and opening inwardly of the tubular hub element and adapted to be substantially closed off by a bearing sleeve inserted in said hub element, said hub element also having a longitudinally extending feed slot for conducting oil to said channel, a second longitudinally extending feed slot circumferentially spaced from the first-mentioned feed slot and intersecting said channel for conducting oil therefrom, portions of said arm defining an oil passage extending outwardly from the hub element and intersecting said second feed passage at a point spaced from said channel.

10. A rocker arm comprising an arm having a transverse opening, a tubular hub element extending through the opening, means rigidly connecting the element to the arm and comprising a pair of annular bulbed heads on the element, one on each side of the arm, and means for lubricating an end of the arm including an annular passage within each bulbed head and opening inwardly of the tubular hub element and adapted to be substantially closed off by a bearing sleeve inserted in said hub element, said hub element also having a pair of longitudinally extending feed slots one of which intersects and is adapted to conduct oil to each of said passages from a supply opening in the sleeve, and a third longitudinally extending feed slot circumferentially spaced from both previously-mentioned feed slots and communicating independently thereof with both of said passages for conducting oil therefrom.

11. An engine rocker arm comprising an arm member composed of superimposed layers having sockets at its ends for contact bearings, said layers having axially registering hub openings intermediate their ends, a tubular bushing mounted in said openings and sealing the line of contact of the arm layers around said bushing and having an annular oil groove in its inner side, said bushing having an oil passage from said groove, and said arm having a passage extending upwardly between its layers from said first passage to the top edge of the arm, and a bearing bushing mounted in said first bushing to close the inner side of the groove therein and having a radial passage therethrough connecting with said groove.

JOHN R. WINTER, Jr.

REFERENCES CITED

The following references are of record in the file of this patent:

UNITED STATES PATENTS

| Number | Name | Date |
|---|---|---|
| 1,278,195 | Noack | Sept. 10, 1918 |
| 1,449,611 | Konigslow | Mar. 27, 1923 |
| 1,943,631 | Skillman | Jan. 16, 1934 |
| 2,176,083 | Leake | Oct. 17, 1939 |
| 2,217,742 | Gillette | Oct. 15, 1940 |
| 2,415,213 | Leake | Feb. 4, 1947 |